US005789050A

United States Patent [19]

Kang

[11] Patent Number: 5,789,050

[45] Date of Patent: Aug. 4, 1998

[54] PERFORATING AND SLITTING DIE SHEET, METHODS OF CONSTRUCTING SAME AND PAPER PRODUCT PRODUCED THEREFROM

[75] Inventor: Pierson S. Kang, North Wales, Pa.

[73] Assignee: Xynatech, Inc., Rio Rancho, N. Mex.

[21] Appl. No.: 862,279

[22] Filed: May 23, 1997

Related U.S. Application Data

[62] Division of Ser. No. 747,950, Nov. 12, 1996.

[51] Int. Cl.[6] .................................................. B32B 3/10

[52] U.S. Cl. .......................... 428/42.3; 428/43; 428/136; 283/71

[58] Field of Search ........................ 428/43, 136, 42.3; 283/71, 81

[56] References Cited

U.S. PATENT DOCUMENTS

| | | | |
|---|---|---|---|
| 3,257,885 | 6/1966 | Hornung . | |
| 3,706,626 | 12/1972 | Smith et al. | 428/42.3 |
| 3,744,384 | 7/1973 | Jarritt et al. . | |
| 3,850,059 | 11/1974 | Kang . | |
| 3,937,109 | 2/1976 | Korner et al. . | |
| 4,393,738 | 7/1983 | Heyden . | |
| 4,561,355 | 12/1985 | Cuir et al. . | |
| 5,488,889 | 2/1996 | Kang . | |

OTHER PUBLICATIONS

Michael Baddke, *Riverboats Will Be New Self-Adhesive*, Stamp News, Jul. 15, 1996.

Michael Schreiber, *Backing of Self-Stick Test Stamps is Die Cut; Single Stamps, Blocks Are Easily Separated*, Stamp News, Jun. 24, 1996.

*Primary Examiner*—Alexander Thomas

*Attorney, Agent, or Firm*—Panitch Schwarze Jacobs & Nadel, P.C.

[57] ABSTRACT

A paper product has a first sheet with a pattern of spaced openings permitting separation into sections and a second sheet releasably attached to the first sheet with a pattern of continuous curvilinear openings dividing the sheet into sections and being aligned with the openings of the first sheet. A die sheet for a die for cutting material includes a die sheet surface with a die pattern extending outwardly from the die sheet surface. The die pattern has slitting sections providing curvilinear, continuous openings through a second sheet of the material and spaced perforating sections extending above the slitting sections providing a pattern of spaced openings in the first sheet adjacent to the openings through the second sheet. A first method of constructing a die sheet includes covering a die surface with a first, spaced pattern of a first photo-resist material and then covering the first pattern with a second, continuous pattern of a second photo-resist material. A chemical removes material from sections not covered by the second pattern and the second pattern is then removed. A chemical removes material from die surface sections not covered by the first pattern. A second method of constructing a die sheet includes covering sections of a die surface with a pattern of photo-resist material having alternating slitting segments and wider perforating segments. A chemical removes material from uncovered sections and completely undercuts the slitting segments to form slitting sections and undercuts the perforating segments to form higher extending perforating sections.

8 Claims, 9 Drawing Sheets

PERFORATING AND SLITTING DIE SHEET, METHODS OF CONSTRUCTING SAME AND PAPER PRODUCT PRODUCED THEREFROM

This is a division of application Ser. No. 08/747,950, filed Nov. 12, 1996 pending.

FIELD OF THE INVENTION

The present invention relates to die sheets for cutting dies, methods of constructing such die sheets and products produced therefrom, and more particularly, to a die sheet or roll for a cutting die for producing curvilinear patterns of perforations adjacent to patterns of continuous slits.

BACKGROUND OF THE INVENTION

Cutting dies, in particular rotary cutting dies for cutting paper products, are well known. Cutting dies are used for cutting shapes in paper, plastic film and thin metal foil. In particular, they are used in the printing and packaging industries for cutting perforations and openings in pressure sensitive labels.

Pressure sensitive labels, markers, and other similar articles formed by cutting dies are usually made available in strips or rolls. A plurality of such labels or the like are attached to an elongated backing layer by a pressure sensitive adhesive or gum. The pressure sensitive adhesive or gum is permanently adhered to the back of the label while the backing layer is provided with a release coating. Hence, a label having pressure sensitive adhesive separates readily from the backing layer or release layer. The user merely peels the labels or markers from the backing layer and applies the peeled-off labels or markers as required.

In order to mass produce these labels or markers, a strip comprising a layer of label material, a layer of pressure sensitive adhesive and a backing layer are assembled and passed under the cutting die. The cutting die may have any convenient arrangement or array of patterns thereon in accordance with the shapes desired for the labels. The labels are formed by cutting through the layer of label material adhered to the backing layer and through the adhesive layer beneath the layer of label material. Often, the dimensions of the cutting edge, as well as the tolerance of the dimensions, are selected to prevent the die from cutting through the backing layer. In this manner a continuous strip or sheet of labels is maintained.

Furthermore, it is known to form a flexible die or die roll by a chemical etching process. The chemical etching of the flexible dies is performed primarily by the use of a photofabrication technique. In this photofabrication technique the metal forming the die is first coated on its front side with a light sensitive "photo-resist". The photosensitive resist is exposed to ultraviolet rays through a photographic transparency containing a clear image of the features of the die cutting pattern. Flexible cutting dies formed by this type of chemical photoetching process are either secured magnetically to magnetic cylinders or rollers or to non-magnetic cylinders using an adhesive layer between the die and the non-magnetic cylinder.

One particular use for the cutting dies described above is for the postage stamp industry, specifically for the production of "peel-away" stamps which have an adhesive layer that enables the stamp to be peeled from a backing sheet and placed on an envelope or other surface without having to wet the back of the stamp. Generally, the peel-away stamps that are produced by known methods have the serpentine edges which are familiar to the old style gummed-back stamps. However, sheets of peel-away stamps as currently produced have a solid backing sheet which does not allow a backing section for an individual stamp to be easily detachable from the remainder of the backing sheet when detaching a single stamp.

In an attempt to overcome the inability of peel-away stamps to have an individually detachable backing, a die sheet was developed to produce sheets of postage stamps which have a stamp sheet with continuous openings and a backing sheet with spaced openings aligned with the openings of the stamp sheet. These die sheets are referred to as a "perf-over-slit" die sheets and they have two cutting levels: a lower slitting level having continuously joined cutting members and an upper perforating level which has spaced cutting members. With such a die sheet, a pattern of straight lines of spaced openings can be produced in a first sheet of a material and a pattern of straight continuous openings can be produced in a second sheet of material which is in facing relationship with the first sheet of material. Postage stamps have been produced by such dies, but such postage stamps have not been accepted by collectors who have rejected the straight-edged stamps for not being as aesthetically pleasing as classical serpentine-edged stamps.

The utility of perf-over-slit die sheets has been limited to producing patterns of straight cuts in materials because it has been too difficult and too costly to attempt to construct a perf-over-slit die sheet with cutting edges that produce curved openings using conventional methods. Attempts have been made to produce perf-over-slit die sheets by forming a cutting surface extending above a die sheet by a chemical etching process and then machining away sections of the material to produce a lower cutting level (the slitting level) at sections where the material has been machined away and an upper cutting level (the perforating level) at sections where no machining occurred.

As these die sheets have relatively short cutting levels and closely packed die patterns, it has been extremely difficult to attempt to produce perforating sections on a curved cutting pattern due to the large number of direction changes required during the milling or grinding of a curved die pattern. Attempts at producing a die sheet having a curvilinear "perf-over-slit" die pattern using conventional machining methods have been unsuccessful.

Therefore, there is a need for a paper product, particularly for the postage stamp industry, which has a pattern of continuous, serpentine-shaped openings in a first sheet of material (the sheet of stamps) and a pattern of spaced, curvilinear openings in a second sheet of material (the backing sheet) which are aligned with the openings of the first sheet. Such a paper product will have an appearance which appeals to stamp collectors and will enable the individual stamps to be separable from the remainder of the sheet along with an individual section of the backing material. Thus, there is also the need a die sheet to form such a product and a method or methods for producing such a die sheet.

SUMMARY OF THE INVENTION

In a first aspect, the present invention is a paper product having a first sheet which has a pattern of one or more lines of spaced openings extending at least partially through it a distance sufficient to permit the sheet to be readily separable into one or more sections. The one or more lines of spaced openings divides the first sheet into a plurality of sections. The paper product further includes a second sheet which is releasably attached in facing engagement to the first sheet and has a pattern of continuous curvilinear openings extending through it. The pattern of continuous curvilinear openings divides the second sheet into a corresponding plurality of sections and are aligned with the pattern of spaced openings of the first sheet.

In a second aspect, the present invention is a die sheet for a die for cutting a material having first and second sheets in facing relationship, and preferably for forming the paper product discussed above. The die sheet includes a die sheet surface having a die pattern extending outwardly from the die sheet surface to form a cutting surface of the die sheet. The die pattern has at least one slitting section having at least one cutting edge configured for providing a curvilinear, continuous opening through the second sheet of the material. The die pattern further includes a plurality of spaced perforating sections extending outwardly from the slitting sections. Each of the perforating sections has at least one cutting edge and is configured for extending at least partially through the first sheet of the material. The plurality of perforating sections is configured for providing a pattern of spaced openings in the first sheet adjacent to the curvilinear openings through the second sheet.

In a third aspect, the present invention is a first method of constructing a die sheet for cutting material which includes the following steps. A plurality of spaced sections of a die sheet surface of the die sheet is covered with a first photo-resist material to form a first pattern of a first width. The plurality of sections are disposed on the die sheet surface so that the first pattern is generally curvilinear. At least one continuous section of the die sheet surface is covered with a second photo-resist material to form a second pattern of a second width, which is greater than the first width. The second pattern covers the first pattern and is curvilinear. Material is removed from sections of the die sheet not covered by the second pattern by applying a chemical to the die sheet surface of the die sheet. The second photo-resist material of the second pattern is removed from the die sheet by applying a solvent to the cutting surface of the die sheet. The first photo-resist material of the first pattern is non-reactive with the solvent. Material is removed from sections of the die sheet not covered by the first pattern by applying a chemical to the cutting surface of the die sheet.

In a fourth aspect, the present invention is a second method of constructing a die sheet for cutting material which includes the following steps. At least one continuous curvilinear section of a die sheet surface of the die sheet is covered with a photo-resist material to form a pattern of alternating slitting segments of a first width and perforating segments of a second width, which is greater than the first width. Material is removed from the die sheet surface of the die by applying a chemical to the die sheet surface to form a cutting surface extending above a remainder of the die sheet surface. The photo-resist material is resistant to the chemical. The chemical completely undercuts the slitting segments to form slitting sections of the cutting surface and at least partially undercuts the perforating segments to form perforating sections of the cutting surface. The perforating sections have a greater height than the slitting sections.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings, which are diagrammatic, embodiments which are presently preferred. It should be understood, however, that the invention is not limited to the precise arrangements and instrumentalities shown. In the drawings.

DETAILED DESCRIPTION OF PREFERRED EMBODIMENTS

Certain terminology is used in the following description for convenience only and is not limiting. The words "upper" and "lower" refer to a greater height and a lesser height, respectively, above a die sheet surface. The terminology includes the words above specifically mentioned, derivatives thereof and words of similar import.

Figure 1:
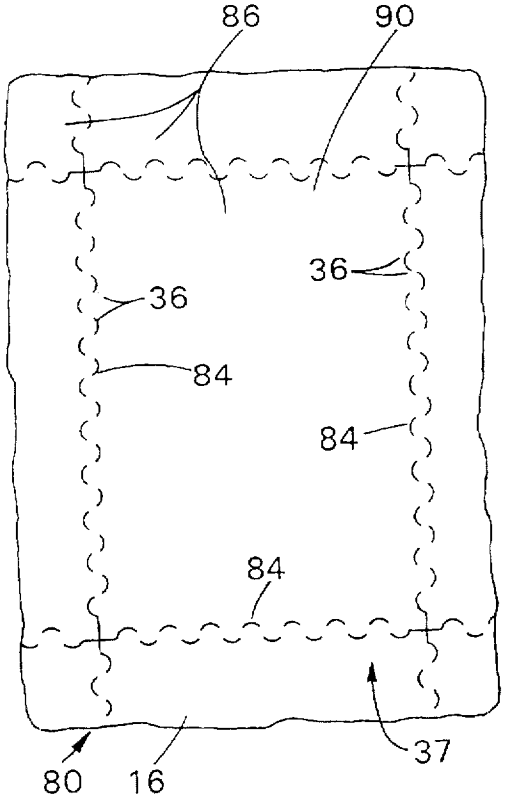
FIG. 1 is an enlarged partial bottom plan view of a paper product according to the present invention.
Figure 2:
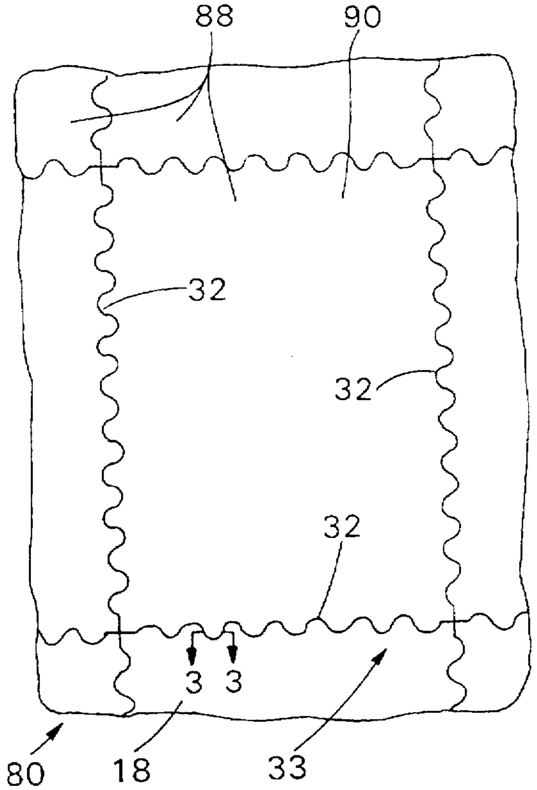
FIG. 2 is an enlarged partial top plan view of a paper product according to the present invention.
Figure 3:
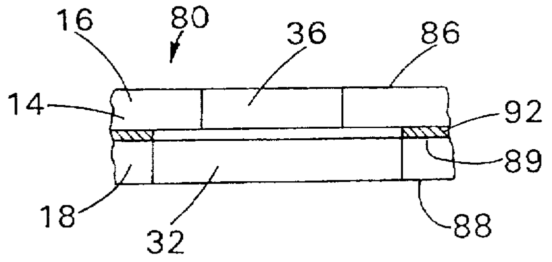
FIG. 3 is an enlarged cross-sectional view of the paper product of the present invention taken along lines 3—3 of FIG. 2.

Referring now to the drawings in detail, wherein like numerals are used to indicate like elements throughout, there is shown in FIGS. 1–3 a preferred embodiment a paper product 80 including a first sheet 16 and a second sheet 18 in facing relationship. Referring to FIGS. 1 and 3, the first sheet 16 has a pattern 37 of one or more lines 84 of spaced openings 36 extending at least partially therethrough a distance sufficient to permit the first sheet 16 to be readily separable into one or more sections 86. Preferably, each of the lines 84 of spaced openings or perforations 36 extending through the first sheet 16 is serpentine-shaped, as shown in FIG. 1, and extends completely through the first sheet 16, as shown in FIG. 3.

The pattern 37 of lines 84 of spaced openings 36 divides the first sheet 16 into a plurality of backing sections 86. Each backing section 86 of the first sheet 16 is detachable from the remainder of the first sheet 16 by tearing the first sheet 16 along the one or more lines 84 of the pattern 37 of spaced openings 36.

Referring to FIGS. 2 and 3, the second sheet 18 is releasably attached in facing engagement to the first sheet 16 and has a pattern 33 of continuous curvilinear openings 32 extending therethrough. The pattern 33 of continuous curvilinear openings 32 divides the second sheet 18 into a plurality of label sections 88, each corresponding to one aligned section 86 of the first sheet 16, and is aligned with the pattern 37 of spaced openings 36 of the first sheet 16. Preferably, each of the continuous curvilinear openings 32 extending through the second sheet 18 is serpentine-shaped, as shown in FIG. 2.

Referring to FIG. 2, the pattern 33 of continuous curvilinear openings 32 extending through the second sheet 18 form at least one quadrilateral 90, and preferably a plurality of quadrilaterals 90, which each bound one label section 88 of the second sheet 18. Each label section 88 of the second sheet 18 includes an adhesive material 92 attached to an inward-facing surface 89 of the second sheet 18, as shown in FIG. 3. The adhesive material 92 releasably attaches each of the label sections 88 of the second sheet 18 to the first sheet 16. The adhesive material 92 remains attached to the inward-facing surface 89 upon removal of one of the label sections 88 of the second sheet 18 from the first sheet 16 to enable attachment of the removed label section 88 of the second sheet 18 to another surface, such as, for example, the front of a paper envelope (not shown). The aligned backing and label sections of the first sheet 16 and the second sheet 18 are removable from a remainder of the first and second sheets 16 and 18 as a single unit (not shown). This is accomplished by tearing along one or more lines 84 of spaced openings 36 of the first sheet 16 while the label sections 88 of the second sheet 18 are still attached by the adhesive material 92 to the corresponding backing sections 86 of the first sheet 16.

Furthermore, each of the label sections 88 of the second sheet 18 are detachable from the remainder of the label sections 88 of the second sheet 18 and from the first sheet 16. Separation of each label section 88 is accomplished by peeling the label section 88 from the backing section 86 of the first sheet 16 with which it is aligned so that the adhesive layer 92 backing the inward facing surface 89 of the label section 88 becomes detached from the corresponding backing section 86 of the first sheet 16.

Preferably, the first sheet 16 and the second sheet 18 are different materials. Most preferably, the second sheet 18 is a thin paper of a weight and type usually used to construct U.S. postage stamps with a releasable glue-backing well understood by those of ordinary skill in the art. The first sheet 16 is preferably relatively stiff paper such as a thin paperboard/heavy weight paper to provide the paper product 80 with self-support. However, it is within the scope of the present invention to form the paper product 80 so that the first sheet 16 and the second sheet 18 are the same material 14 and to produce the paper product 80 from any other combination of materials appropriate for the intended application of the product 80.

In the preferred embodiment, the backing and label section 86, 88 are preferably U.S. postage stamp size. However, it is understood by those of ordinary skill in the art from this disclosure that the present invention is not limited to any particular size backing or label sections 86, 88.

Referring to FIGS. 4–10, the present invention further includes a die sheet 10 for a die 12 for cutting a material 14 having a first sheet 16 and a second sheet 18 in facing relationship and preferably for forming a paper product 80 as described above. The die sheet 10 is comprised of a die sheet surface 20 having a die pattern 22 extending outwardly from the die sheet surface 20 to form a cutting surface 24 of the die sheet 10. The die pattern 22 has a least one slitting section 26 and a plurality of spaced perforating sections 28, each type of section being described in detail below.

Figure 6:
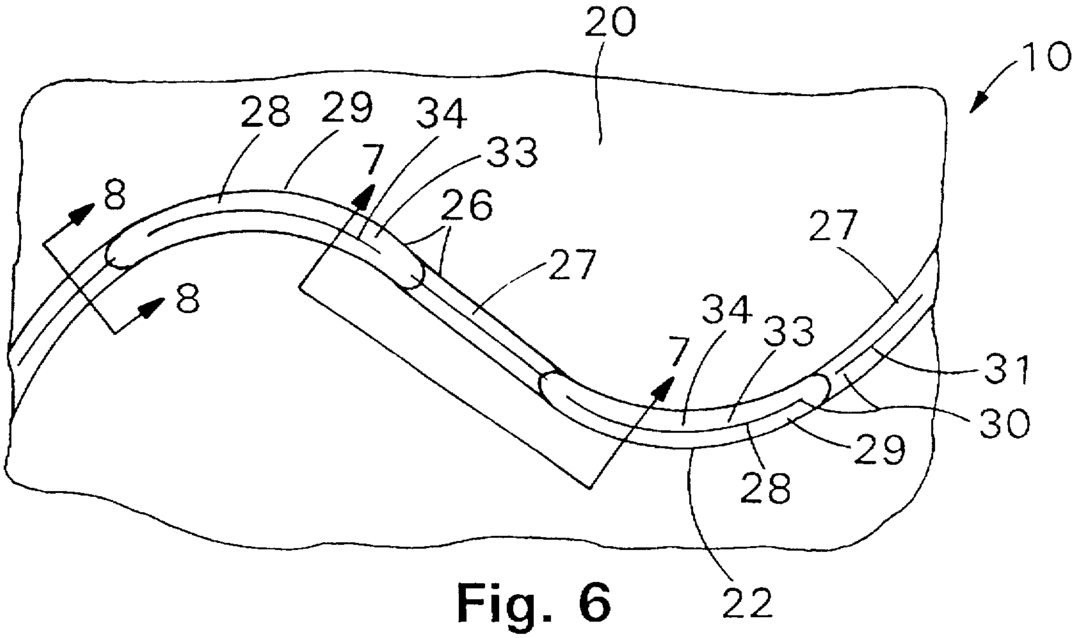
FIG. 6 is a greatly enlarged fragmentary view of the die sheet of FIG. 5.
Figure 7:
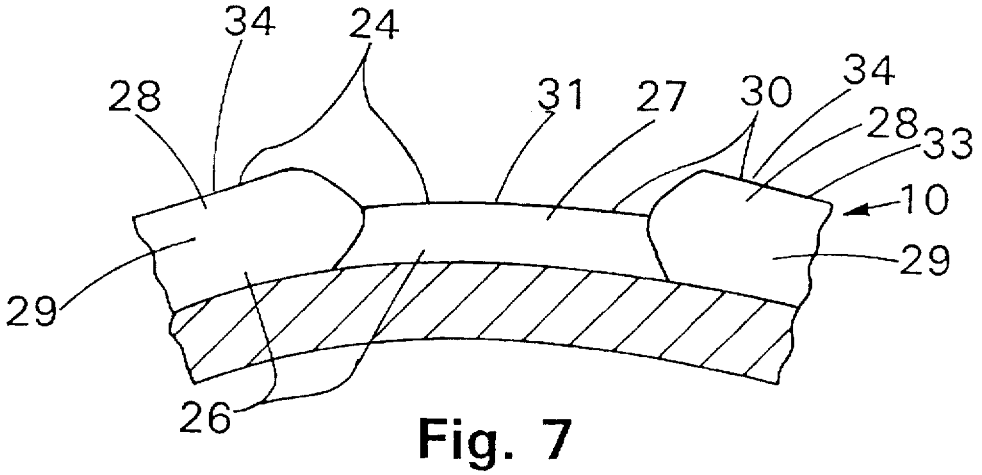
FIG. 7 is an enlarged cross-sectional view of the die sheet shown in FIG. 6 taken along 7—7 of FIG. 6.

Referring now to FIGS. 1–4 and 6–8, each slitting section 26 has at least one cutting edge 30 configured for providing a curvilinear, continuous opening 32 through the second sheet 18 of the material 14. A slitting section 26 is constructed of two types of segments, as best shown in FIG. 7. The two types of segments are slitting segments 27, which perform slitting alone, and perf-over-slit segments 29, which include the perforating segments 28 and perform both slitting of the second sheet 18 and perforation of the first sheet 16. Both the slitting segments 27 and the perf-over-slit segments 29 of a slitting section 26 are required to provide a continuous curvilinear opening 32 in a second sheet 18 of a material 14. In other words, the cutting edge 30 of a slitting section 26 consists of cutting edge sections 31 of the slitting segments 27 and cutting edge sections 33 of the perf-over-slit segments 29, which are the cutting edges of the perforating sections 28 as described below.

Figure 8:
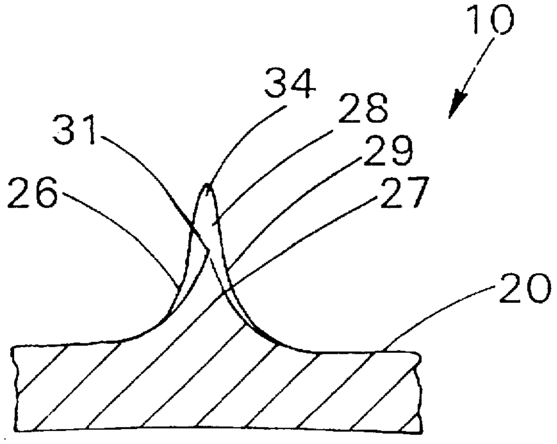
FIG. 8 is an enlarged cross-sectional view of the die sheet shown in FIG. 6 taken along lines 8—8 of FIG. 7.
Figure 9:
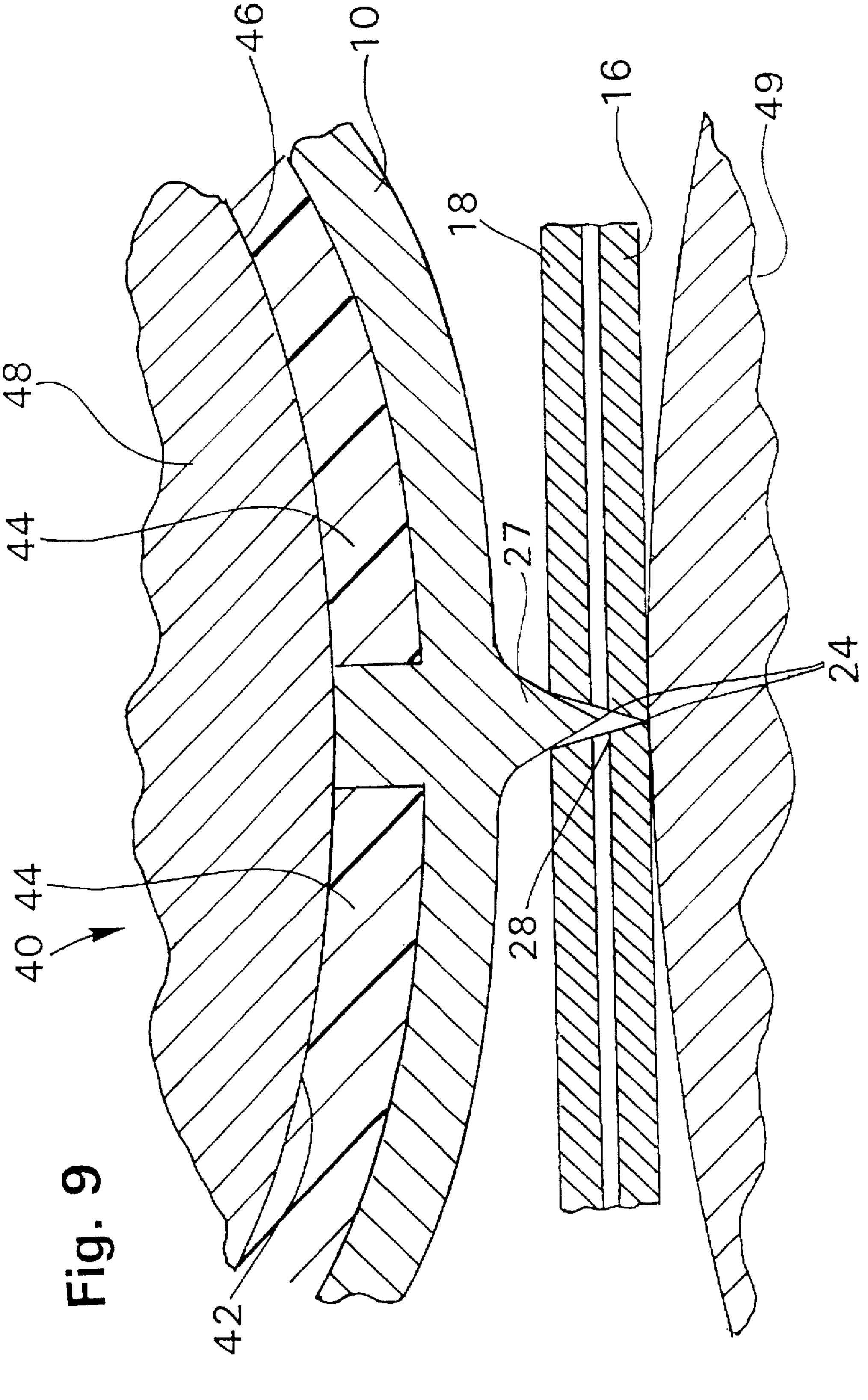
FIG. 9 is a greatly enlarged cross-sectional view of the die assembly shown in FIG. 4 taken along lines 9—9 of FIG. 4, illustrating the cutting action of a die sheet assembled in a cutting die.

The cutting edge sections 31 of the slitting segments 27 are preferably single-edged, as best shown in FIGS. 6, 8 and 9. However, it is within the scope of the present invention to construct the slitting segments 27 so that the cutting edge sections 31 are double-edged (not shown).

Figure 4:
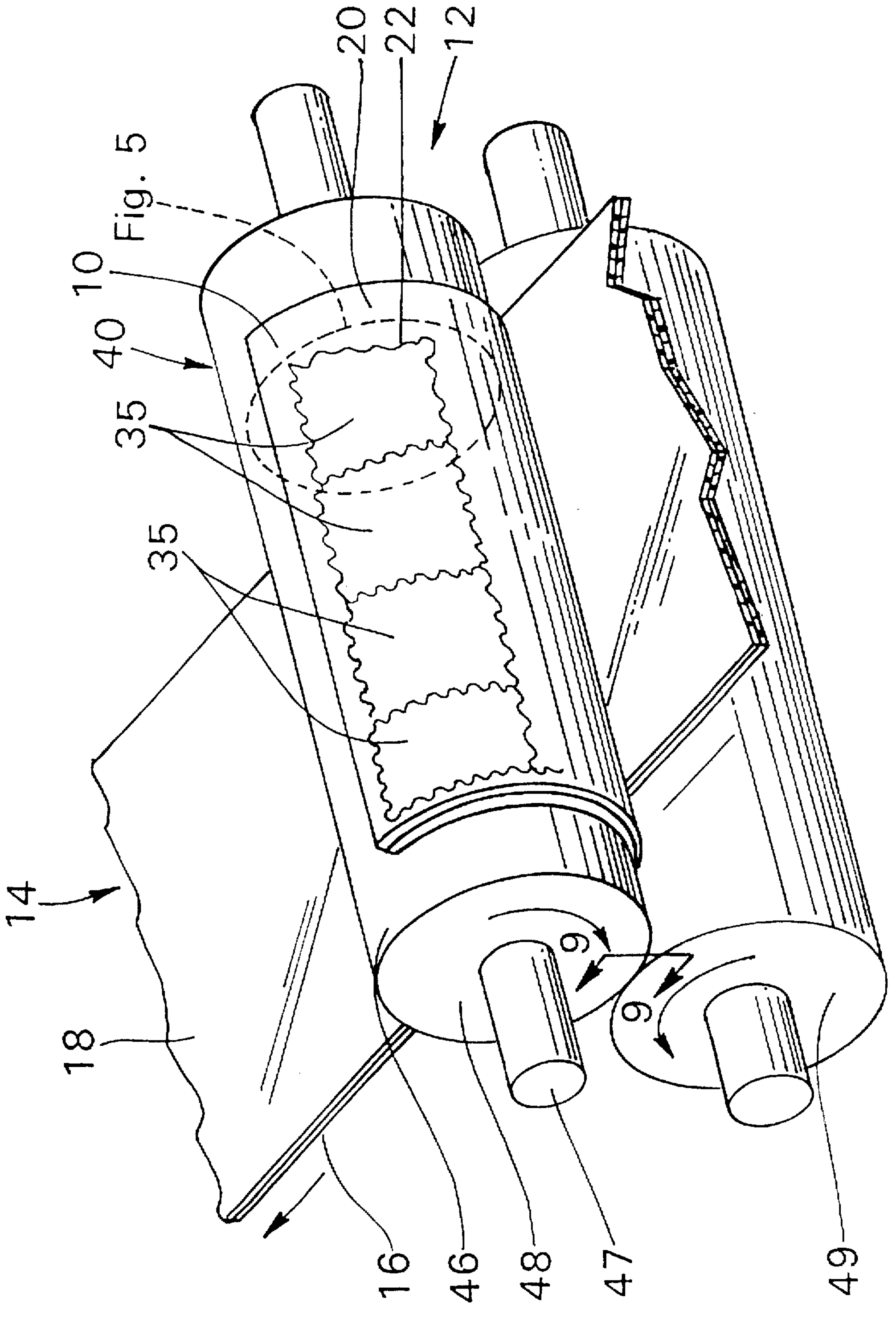
FIG. 4 is a perspective view of a die assembly in the process of forming a paper product in accordance with the present invention.

Referring to FIGS. 4–7, preferably, the cutting edges 30 of all of the slitting sections 26 combined are configured for providing a serpentine-shaped opening 32 through the second sheet 18 of material 14, the opening 32 being as shown in FIGS. 2 and 4. However, it is within the scope of the present invention to construct the slitting sections 26 so that the opening 32 has other curvilinear shapes, such as, for example, a single arcuate curve (not shown) or a complex curve (not shown). The present invention is intended to embrace all slitting sections 26 which, when combined, are configured to provide an opening 32 in the second material 18 having any shape other than a straight line.

Figure 5:
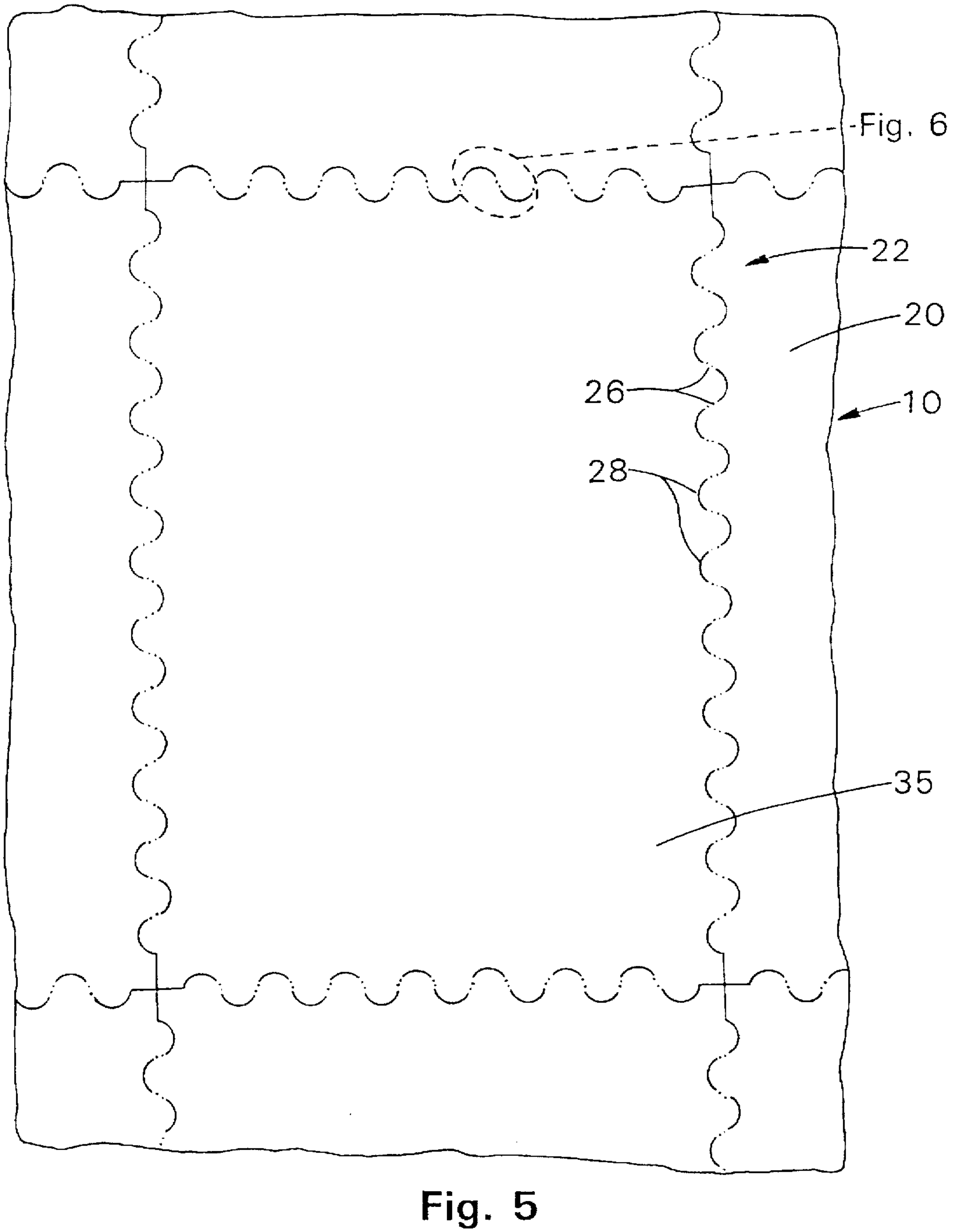
FIG. 5 is a greatly enlarged fragmentary view of a portion of a die sheet which forms a portion of the die assembly of FIG. 1.

Furthermore, as shown in FIGS. 2, 4 and 5, the die pattern 22 preferably includes a plurality of slitting sections 26 configured to provide a pattern 33 of continuous curvilinear openings 32 in the paper product 80. Preferably, the plurality of slitting sections 26 are arranged so that the die pattern 22 includes at least one quadrilateral 35, and most preferably a plurality of quadrilaterals 35, formed by the arrangement of the slitting sections 26, as shown in FIGS. 4 and 5.

Referring again to FIGS. 4–10, the plurality of spaced perforating sections 28 extend outwardly from the slitting sections 26. More specifically, each perforating section 28 extends outwardly from one of the perf-over-slit segments 29, such that the perforating section 28 is the upper portion of the perf-over-slit segment 29. The plurality of perforating sections 28 are configured for providing a pattern 37 of spaced openings 36 in the first sheet 16 adjacent to the curvilinear openings 32 through the second sheet 16, the openings in the two sheets being arranged as shown in FIGS. 1–3.

Each of the perforating sections 28 has at least one cutting edge 34 and is configured for extending at least partially through the first sheet 16 of the material 14. The cutting edge 34 is also the cutting edge section 33 of a perf-over-slit segment 29 of the slitting section 26 so that the cutting edge 34 is both a separate cutting edge and a section of the cutting edge 30. The dual designation of the cutting edge is necessary due to each perforating section 28 being intended to function by extending completely through the second sheet 18 of the material 14 to form a portion of a continuous opening 32 and also by extending at least partially through the first sheet 16 to form one opening 36 in the pattern 37 of spaced openings 36.

Preferably, as shown in FIGS. 5 and 6, each perforating section 28 is constructed having an arcuate shape, and most preferably, a substantially semi-circular shape. However, it is within the scope of the present invention to construct the perforating sections 28 to have any other appropriate shape, such as, for example, circles or quadrilaterals.

In the preferred embodiment of a die sheet 10 for forming the paper product 80 of the present invention wherein the paper product 80 is comprised of 50 pound first and second sheets 16, 18, the cutting edges 31 of the slitting segments 27 of the slitting sections 26 preferably extend from about 0.010 to about 0.012, and most preferably about 0.011, above the remainder of the die sheet surface 20. Furthermore, the cutting edges 34 of the perforating sections 28 preferably extend from about 0.0135 to about 0.014, and most preferably about 0.014, above the remainder of the die sheet surface 20. These dimensions will vary depending upon the paper thickness.

Preferably, the die sheet 10 is constructed of a metal such as hardened high carbon steel or hardened stainless steel by one of the methods described in detail below. However, it is within the scope of the present invention to construct the die sheet 10 from any other appropriate material, such as tool steel, and to construct the die sheet 10 by any other process which is capable of producing the die sheet 10 as described above.

Referring to FIGS. 4 and 9, the present invention includes a die assembly 40 for cutting a material 14 having a first sheet 16 and a second sheet 18 in facing relationship. The die assembly 40 is comprised of a die sheet 10, as described in detail above, a pressure surface 42 in engagement with the die sheet 10 for applying the die sheet 10 to the material 14 and an adhesive 44 securing the die sheet 10 to the pressure surface 42. Preferably, the pressure surface 42 is the outer surface 46 of a cylindrical die roll or platen 48 mounted to a shaft 47 which enables rotation of the platen 48. The pressure surface 42 applies cutting force to the die sheet 10 to cut the material 14 pressed between the die sheet 10 and a hard roll 49. The platen 48 and the hard roll 49 are mounted within a conventional cutting press (not shown), which is well known to one skilled in the relevant art and need not be described further herein. The adhesive 44 is preferably an epoxy resinous material, however, it is within the scope of the present invention to utilize any other appropriate adhesive material for adhesive 44. The die sheet 10 can also be mounted onto a magnetic cylinder, as is well understood by those of ordinary skill in the art.

Figure 10:
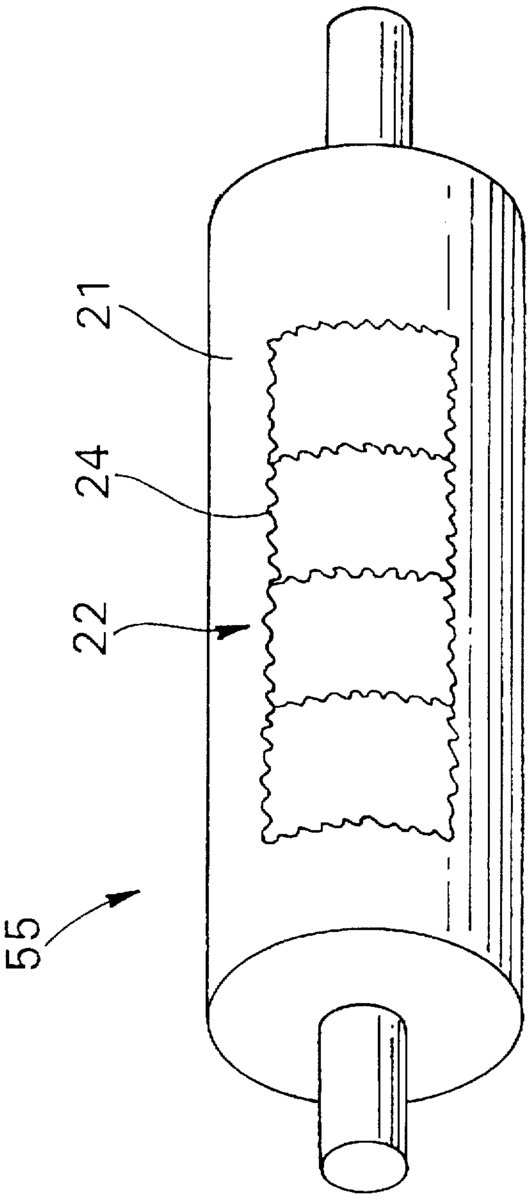
FIG. 10 is a perspective view of a solid cylindrical die in accordance with a second embodiment of the present invention.

Referring to FIG. 10, in the second embodiment, the present invention further includes a die 55, having a die surface 21, for cutting the material 14 having a first sheet 16 and a second sheet 18 in facing relationship. The elements of the die surface 21 of the die 55 are similar to the elements of the die sheet surface 20 of the die sheet 10 and, therefore, reference is made to FIGS. 5–8. The die 55 is comprised of a die surface 21 having a die pattern 22 extending outwardly from the die surface 20 to form a cutting surface 24 of the die 54. The die pattern 22 has at least one slitting section 26 having at least one cutting edge 30 configured for providing a curvilinear, continuous opening 32 through the second sheet 18 of the material 14. Furthermore, the die pattern 22 has a plurality of spaced perforating sections 28 extending outwardly from the slitting sections 26. Each of the perforating sections 28 has at least one cutting edge 34 and is configured for extending at least partially through the first sheet 16 of the material 14. The plurality of perforating sections 28 are configured for providing a pattern of spaced openings 36 in the first sheet 16 adjacent to the curvilinear opening 32 through the second sheet 18.

Preferably, as shown in FIG. 10, the die 55 is constructed as a cylinder which is capable of being rotationally mounted in a conventional cutting press (not shown). However, it is within the scope of the present invention to construct the die 55 as a rectangular solid (not shown) which would be utilized in a cutting press (not shown) capable of producing reciprocating linear movement of the die.

Figure 11:
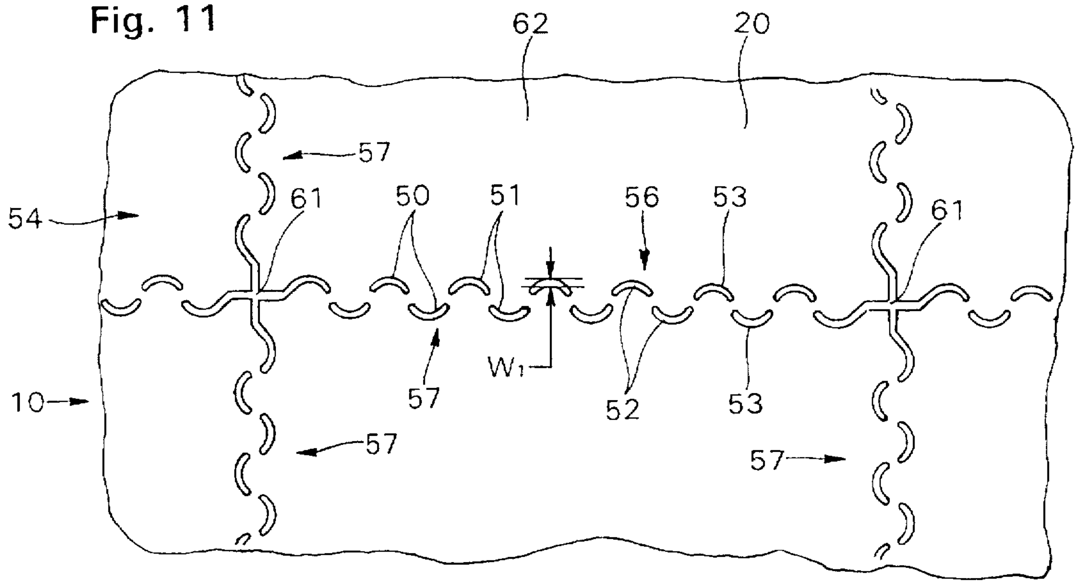
FIG. 11 is an enlarged partial top plan view of a first pattern of a first photo-resist material according to a first preferred method of the present invention, shown on a die sheet surface.
Figure 12:
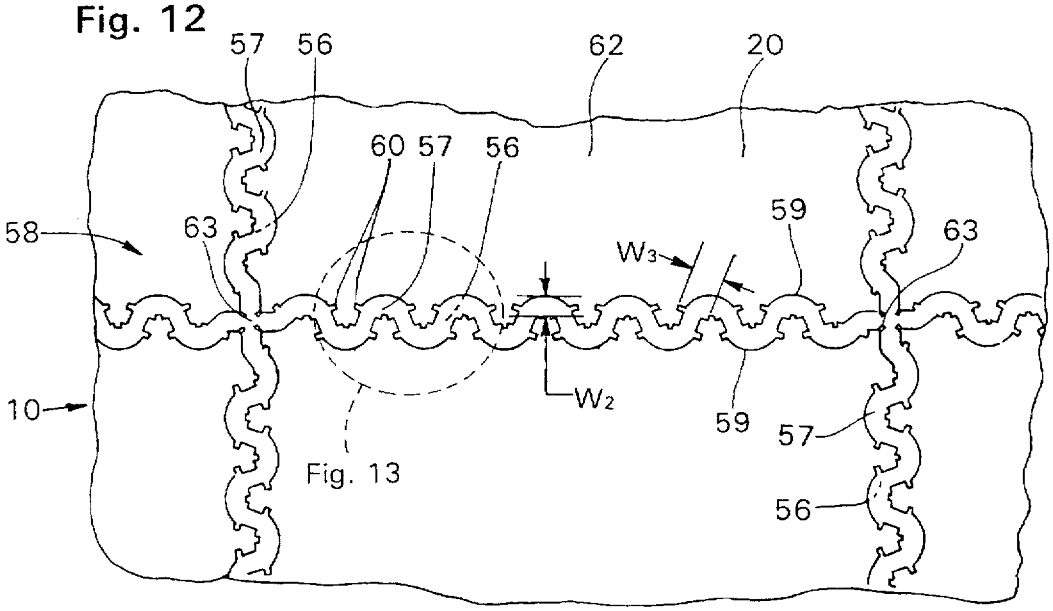
FIG. 12 is an enlarged partial top plan view of a second pattern of a second photo-resist material according to the first preferred method of the present invention, shown on the die sheet surface of FIG. 11.
Figure 13:
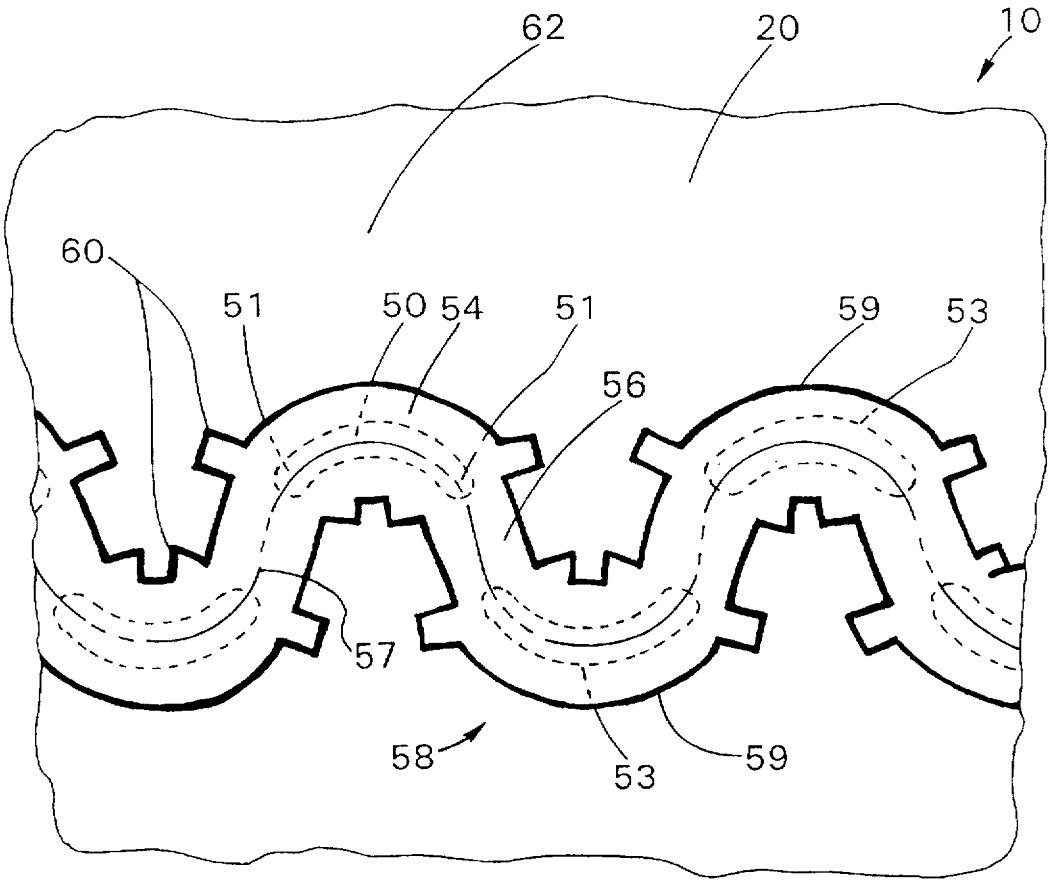
FIG. 13 is a greatly enlarged fragmentary view of the die sheet surface of FIG. 12, illustrating the overlapping nature of the first and second patterns.

Referring to FIGS. 11–13, the present invention includes a first preferred method for constructing a die sheet 10 for cutting the material 14, and preferably for forming the paper product 80 described above, comprised of the following steps. The die sheet 10 constructed by the first preferred method includes all the elements described above in the detailed description of the die sheet 10. In the method outlined below, the die sheet 10 is preferably constructed from a thin rectangular block or a cylindrical block of a metal, such as hardened high carbon steel or hardened stainless steel, and preferably tool steel.

First, as shown in FIG. 11, a plurality of spaced sections 50 of a die sheet surface 20 of the die sheet 10 are covered with a first photo-resist material 52 to form a first pattern 54 of a first width $W_1$. The first width $W_1$ varies, depending upon paper thickness, the press used and the die configuration. The plurality of sections 50 are disposed on the die sheet surface 20 so that the first pattern 54 is generally curvilinear. Preferably, each of the spaced sections 50 has an arcuate shape which is substantially half-elliptical, as shown in FIG. 8. However, it is within the scope of the present invention to cover spaced sections 50 which have any other appropriate shape.

Preferably, the first pattern 54 of the first photo-resist material 52 is comprised of a plurality of covered spaced sections 50 of the die sheet surface 20 which are disposed as a plurality of curvilinear dashed lines 57 and which intersect in a substantially perpendicular manner. Further preferably, the dashed lines 57 of the first pattern 54 intersect to form a cross-shaped portion 61 which has an arcuate section extending from each end, as shown in FIG. 11.

As photo-resist materials are known, it is unnecessary to discuss in detail the reasons for selecting a particular first photo-resist material 52. However, it is preferred to use negative photo-resist for the first photo-resist material 52, which are resistant to inorganic solvents but not resistant to organic solvents, the purpose for this resistance criteria being discussed below. It will be appreciated by those skilled in the art that other materials may be utilized for the first photo-resist material 52 and the present invention is intended to embrace these alternative materials.

Furthermore, as techniques for applying photo-resist patterns are also well known to those skilled in the relevant art, detailed discussion of the actual processes for applying the first pattern 54 is also unnecessary. It is preferred, however, to cover at least a portion of the die sheet surface 20 with the photo-resist material 52, and then place a pattern negative (not shown) onto the covered die sheet surface 20 and project ultraviolet light onto the top of the pattern negative to transfer the desired first pattern 54 to the first photo-resist material 52. Photo-resist material that is exposed to the ultraviolet light adheres to the die sheet surface 20 and the material in areas not radiated with ultraviolet light, the areas covered by the pattern negative, would then be washed from the die surface 20 with an appropriate developing solution, such as xylene.

Referring now to FIG. 12, next, at least one continuous section 56 of the die sheet surface 20 is covered with a second photo-resist material 57 to form a second pattern 58 of a second width $W_2$. The second width $W_2$ varies, depending upon paper thickness, the press used and the die configuration. The second pattern 58 covers the first pattern 54 and is curvilinear. As the second width $W_2$ of the second pattern 58 is greater than the first width $W_1$ of the first pattern 54, the sides 59 of the second pattern 58 extend beyond the sides 53 of the first pattern 54, as shown in FIG. 13.

Preferably, a plurality of continuous sections 56 of the die sheet surface 20 are covered by the second pattern 58 of the second photo-resist material 57, as is shown in FIG. 12, which preferably intersect in a substantially perpendicular manner to form a plurality of quadrilaterals (not shown). Further preferably, the plurality of continuous sections 56 intersect to form a cross-shaped section 63, as shown in FIG. 12.

Referring now to FIGS. 12 and 13, it is further preferred that the second pattern 58 includes a plurality of reinforcing segments 60 of a third width $W_3$. Each of the reinforcing segments 60 is disposed proximal to a longitudinal end 51 of each of the spaced sections 50 of the die sheet surface 20 covered by the first pattern 54. The third width $W_3$ is greater than the second width $W_2$, so that the reinforcing segments 60 extend from both of the sides 59 of the second pattern 58. Preferably, each of the reinforcing segments 60 is shaped substantially as a quadrilateral, as shown in FIGS. 12 and 13, although it is within the scope of the present invention to form the reinforcing segments 60 as another appropriate shape, such as, for example, elliptical. The purpose of these reinforcing segments 60 is discussed in detail below.

Preferably, the second photo-resist material 57 is aqueous photo-resist, which is not resistant to inorganic solvents as are the preferred materials for the first photo-resist material 52. However, it will be appreciated by those skilled in the art from this disclosure that other materials may be utilized for the second photo-resist material 57 and the present invention is intended to embrace these alternative materials. The second pattern 58 is preferably applied to the die sheet surface 20 in the same manner as the first pattern 54, but may be accomplished by any other method known to those skilled in the relevant art.

Next, die material is removed from the sections 62 of the die sheet 10 not covered by the second pattern 58 by applying a chemical (not shown) to the die sheet surface 20 of said die sheet 10. As chemical etching is well known to those skilled in the relevant art, detailed explanation of the mechanics of the material removal process of the present method is unnecessary. The chemical removes die material from the die sheet surface 20 at the non-covered sections 62 to a desired depth, which results in the sections 56 covered by the second pattern 58 extending above the remainder of the die sheet surface 20 by an amount equal to the depth of the die material removed.

In the preferred application of the first method for constructing a die sheet 10 for forming the paper product 80 of the present invention wherein the first and second sheets 16, 18 are 50-pound paper, die material is removed from the non-covered sections 62 of the die sheet surface 20 to a depth of from about 0.013 to about 0.014, and most preferably about 0.013. Thus, the majority of the die material under the second pattern 58 of the second photo-resist material 57 extends above the remainder of the die sheet surface 20 by an equivalent amount.

Furthermore, some die material will be removed from the sections 56 covered by the second pattern 58 by a process referred to as "undercutting". Undercutting of the pattern occurs due to the die material under the photo-resist material being exposed to the chemical after the removal of adjacent, non-covered die material. Undercutting begins at the sides 59 of the second pattern 58 and progresses inwardly toward the centerline 57 of the second pattern 58. The result is that the centerline 57 extends the greatest height above the die sheet surface 20 and there is a boundary section (not shown) where the height of the covered die material tapers down to blend with the remainder of the die sheet surface 20.

The chemical is selected from any known chemical used in metal etching, such as, for example, nitric acid, ferric chloride, hydrochloric acid, and is most preferably ferric chloride. Preferably, the selected chemical is applied to the die sheet surface 20 by continuously spraying the chemical from nozzles (not shown), which are attached to manifold pipes, that oscillate at a high speed across the die sheet surface 20 of the die sheet 10. However, it is well within the capabilities of one skilled in the relevant art to select a suitable chemical and a suitable application technique, such as dipping, to accomplish the removal of material from the uncovered sections of the die surface 20. The present invention is intended to embrace all known alternative processes which accomplish the removal of material from the uncovered sections of the die surface 20 by applying a chemical.

Then, the second photo-resist material 57 of the second pattern 58 is removed from the die sheet 10 by applying a solvent (not shown) to the die sheet surface 20 of the die sheet 10. Removal of a photo-resist material with a solvent is generally known to those skilled in the relevant art so it is unnecessary to discuss in detail herein such matters as the mechanics of the action of a solvent or techniques for applying such solvents. Preferably, the solvent is potassium hydroxide, which is an inorganic solvent. The first photo-resist material 52 of the first pattern 54 is selected to be non-reactive with the solvent, so that the first pattern 54 remains on the die sheet after application of the solvent to the die sheet surface 20. However, it is well within the capabilities of one skilled in the relevant art to select a suitable first photo-resist material 52, a second photo-resist material 57, and a solvent (not shown) so that the second pattern 58 is removed without removing or affecting the first pattern 54.

Finally, die material is removed from sections 62 of the die sheet 10 not covered by the first pattern 54 by applying a chemical (not shown) to the die sheet surface 20 of the die sheet 10. As with the first die material removal step described above, the removal of die material may be accomplished by known chemical or electrolytic techniques.

During this second die material removal step, die material will be primarily removed from two sections of the die surface 22. Material is removed from sections of the die surface 22 which were not covered by the second pattern 58 of the second photo-resist material 57 and from which material was removed during the first die material removal step, which further increases the depth of removed die material. Also, die material is removed from the sections of the die sheet surface 20 which extended above the remainder of the die surface 20 after the first material removal step and which became uncovered after removal of the second pattern 58 of the second photo-resist material 57.

Thus, after the second die material removal step, there will be two levels of the die pattern 22 extending above the remainder of the die sheet surface 20. First, an upper level of perforating sections 28 at the sections of the die surface 20 covered by the first pattern 54 of the first photo-resist material 52. Second, a lower level of the slitting segments 27 of the slitting sections 26 at the sections of the die surface 20 which were covered only by the second pattern 58 of the second photo-resist material 57.

Furthermore, as discussed above in the first die material removal step, undercutting of the first pattern 54 will also occur. Preferably, the first pattern 54 of the first photo-resist 52 is almost completely undercut so that the finished perforating sections 28 have single-edged cutting edges 34. The reinforcing segments 60 of the second pattern 58 enable additional die material to remain after the first die material removal step in the areas of the die sheet surface 20 near the longitudinal ends 51 of the sections 50 covered by the first pattern 54. This additional die material counteracts the tendency of the chemical to excessively undercut the longitudinal ends 51 of the sections 50 covered by the first pattern 54 during this second die material removal step. This excessive undercutting would ordinarily occur due to the simultaneous undercutting of the ends 51 and the sides 53 of each section 50 covered by the first pattern 54 and would cause the finished perforating sections 28 to be shorter than desired.

In the preferred application of the first method for constructing a die sheet 10 for forming the paper product 80 of the present invention, after the second die material removal step, the cutting edges 34 of the perforating sections 28 and the cutting edges 31 of the slitting segments 27 extend above the remainder of the die sheet surface 20 at approximately the preferred dimensions for the die sheet 10 as discussed above.

Preferably, a solvent (not shown) is applied to the die sheet surface 20 to remove the first pattern 54 after the second material removal step. At this point in the method, a die sheet 10 has been constructed which is capable of producing the paper product 80 discussed in detail above. However, it is preferred to further shape the cutting edges sections 31 of the slitting segments 27 of the slitting sections 26 and the cutting edges 34 of the perforating sections 28 (which are also the cutting edge sections 33 of the cutting edges 30 of the slitting sections 26 as discussed above). Final shaping of these cutting edges is accomplished by applying a chemical to hone the edges. Such chemical honing is well known, so it is unnecessary to discuss the process in detail herein. Although it is preferred to utilize ferric chloride to accomplish this chemical honing, any suitable chemical that can be applied to hone the cutting edges is embraced within the scope of the present invention.

Figure 14:
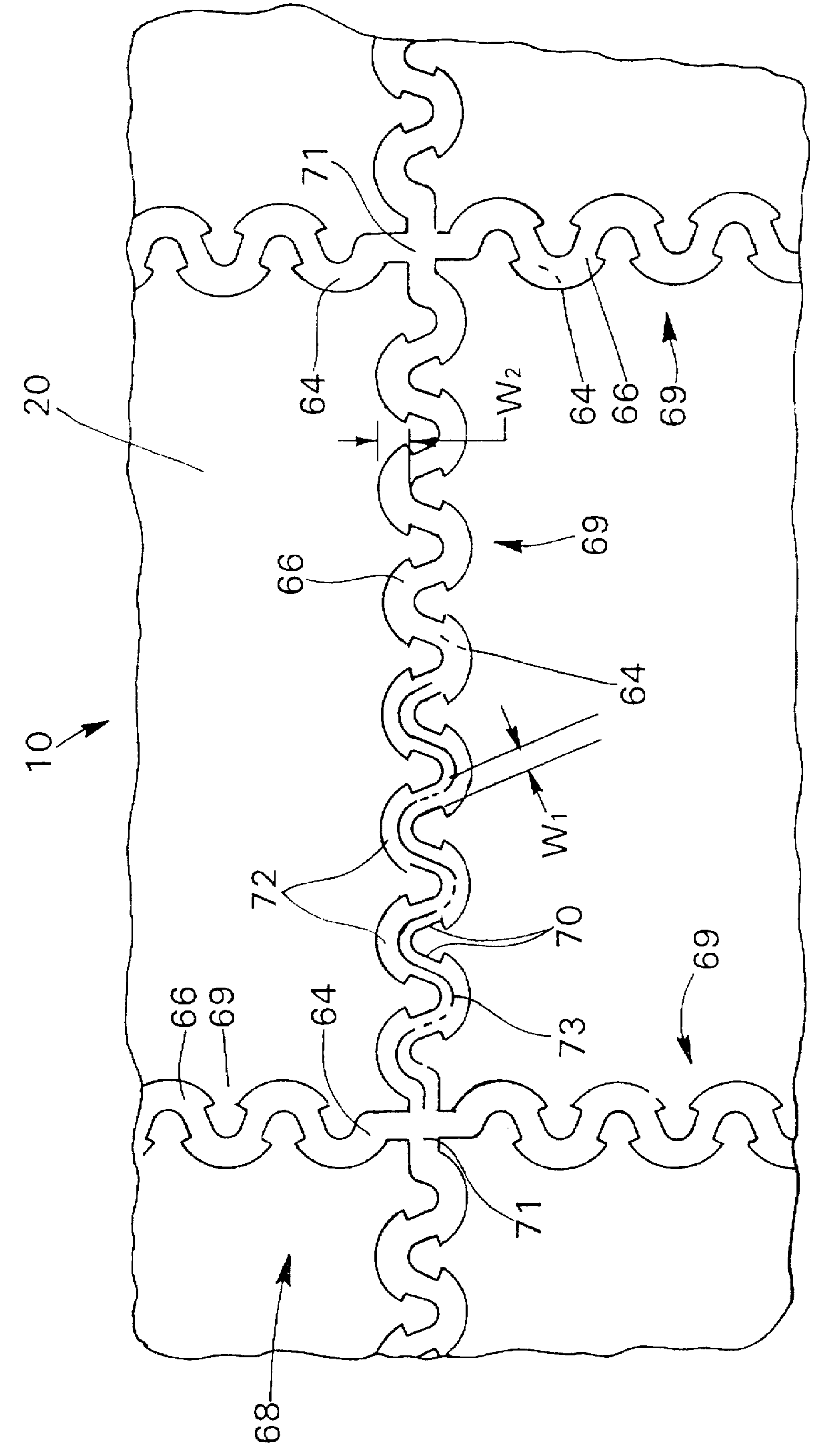
FIG. 14 is an enlarged partial top plan view of a pattern of a photo-resist material according to a second preferred method of the present invention, shown on a die sheet surface.

Referring to FIG. 14, the present invention further includes a second preferred method for constructing a die sheet 10 for cutting a material 14, and preferably for forming the paper product 80. The second method is essentially a two step process, as compared to the multi-step process of the first preferred method. However, both processes result in the construction of a die sheet 10 having all of the elements discussed in detail above in the description of the die sheet 10. In the method outlined below, the die sheet 10 is preferably constructed from the same preferred materials discussed above in the description of the first method.

Referring again to FIG. 14, first, at least one continuous curvilinear section 64 of a die sheet surface 20 of the die sheet 10 is covered with a photo-resist material 66 to form a pattern 68 of alternating slitting segments 70 of a first width W1 and perforating segments 72 of a second width $W_2$. In the pattern 68, the second width $W_2$ is greater than the first width $W_1$. Each of the perforating segments 72 extends from a side of the pattern 68 opposite a side of the pattern 68 from which another most proximal perforating segment 72 extends. In other words, the perforating segments 72 alternately extend from opposite sides of the pattern 68, as is shown in FIG. 14.

Preferably, the pattern 68 of the photo-resist material 66 is comprised of a plurality of curvilinear lines 69 of continuous curvilinear sections 64 of the die sheet surface 20 which intersect in a substantially perpendicular manner. Further preferably, the lines 69 of the pattern 68 intersect to form a cross-shaped section 71 which is joined at each end of the cross to a perforating segment 72, as shown in FIG. 14.

Second, die material is removed from the die sheet surface 20 of the die sheet 10 by applying a chemical (not shown) to the die sheet surface 20 to form a cutting surface 24 extending above the remainder of the die sheet surface 20. The photo-resist material 66 is resistant to the chemical, so the removal of die material beneath the pattern 68 is impeded by the photo-resist material 66. The die material below the pattern 68 is removed only after the removal of adjacent uncovered die material. The covered die material is removed by the applied chemical undercutting the pattern 68, as discussed with the first method.

Once again, as chemical etching is well known to those skilled in the relevant art, detailed explanation of the material removal process of the present method is unnecessary. The chemicals and application technique described as preferred in the above disclosure of the first method are also preferred for the second method.

During the step of removing die material from the die surface 20 of the die sheet 10, the timing is such that the chemical almost completely undercuts the slitting segments 70 to form a slitting section 26 of the cutting surface 24 and at least partially undercuts the perforating segments 72 to form a perforating section 28 of the cutting surface 24. The perforating sections 28 have a greater height than the slitting sections 26. The difference in height between the slitting sections 26 and the perforating sections 28 results from the greater width of the perforating segments 72 of the photo-resist pattern 68 as compared with the width of the slitting segments 70 of the pattern. By applying a sufficient amount of a chemical for a sufficient period of time so that a first width of a resist pattern is completely undercut when there is a second, greater width of the pattern will result in two levels extending above the remainder of the surface of the material to which the chemical is applied.

In the die material removal step, the depth of the material removed from the die sheet surface 20 dictates both the height of the slitting sections 26 and the perforating sections 28 and the relative height differential between the slitting sections 26 and the perforating sections 28 on the finished die sheet 10. Material is removed from the die sheet surface 20 essentially uniformly from the non-covered sections due to the application of the chemical over the entire die sheet surface 20. The effect of undercutting will cause die material to be removed up to the centerline 73 at the slitting segments 70 before the undercutting reaches the centerline 73 at the perforating segments 72. Die material is then removed from the top of the slitting segments 27 of slitting sections 26 while the top of the perforating sections 28 (the perf-over-slit segments 29 of the slitting section 26) are still at the original height above the bottom surface (not shown) of the die sheet 10, or in other words, at the original thickness of the die sheet 10. This will cause a height differential to exist between the top of the slitting segments 27 of the slitting sections 26 and the top of the perforating sections 28 of the die sheet 10.

The height differential discussed above can be varied by adjusting the difference between the width $W_1$ of the slitting segments 70 of the pattern 68 and the width $W_2$ of the perforating segments of the pattern 68. Furthermore, the height of both sections can be varied by varying the widths of each type of segments of the pattern 68. In other words, the wider the two types of segments of the pattern 68 are made, the higher the perforating sections 28 and slitting segments 27 will extend above the remainder of a finished die sheet 10 and the wider both sections will.

Preferably, the chemical almost completely undercuts the perforating segments 72 of the pattern 68 a sufficient distance so that the perforating sections 28 include a single cutting edge 34, as shown in FIGS. 3–5 for the die sheet 10. However, it is within the scope of the present invention to control the etching process so that the chemical only partially undercuts the perforating segments 72, resulting in the perforating sections 28 on the die sheet 10 which include a double cutting edge (not shown).

In the preferred application of the second method for constructing a die sheet 10 for forming the paper product 80 of the present invention, after the die material removal step, the cutting edges 34 of the perforating sections 28 and the cutting edges 31 of the slitting segments 27 extend above the remainder of the die sheet surface 20 at approximately the preferred dimensions for the die sheet 10 as discussed above.

At this point of the method, a die sheet 10 has been constructed which is capable of producing the paper product 80 discussed in detail above. However, as with the first preferred method, it is preferred to further shape the cutting edges sections 31 of the slitting segments 27 of the slitting sections 26 and the cutting edges 34 of the perforating sections 28 by chemical honing.

There are a number of advantages of the present invention in its various aspects. The die sheet 10 is advantageous over prior art "perf-over-slit" die sheets because it can produce curvilinear openings in a material, as opposed to being limited to producing straight-lined openings as were prior art dies. Both methods of constructing the die sheet 10 have the advantage over the prior art method of combined etching and machining in that they are much simpler to perform and have much greater rate of success than the prior art method. Furthermore, the paper product 80 of the present invention has the advantage, when the product is a peel-away postage stamp, of the sections 88 of the second sheet 18 (i.e. a stamp) having curvilinear edges, which are more appealing to a stamp collector than straight edged stamps. Also, the individual label sections 88 of the second sheet 18 can be removed from the remainder of the second sheet 18 along with the corresponding backing section 86 of the first sheet 16. In other words, an individual peel-away stamp, one-label section 88 of the second sheet 18, can be removed from a sheet of such stamps along with its backing paper, the corresponding backing section 86 of the first sheet 16. This is not possible with prior art peel-away stamps available from the United States Postal Service which do not contain perforated backing sheets.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A paper product comprised of:

a first sheet having a pattern of one or more lines of spaced openings extending at least partially therethrough a distance sufficient to permit said sheet to be readily separable into one or more sections, said one or more lines of spaced openings dividing said first sheet into a plurality of sections; and a second sheet releasably attached in facing engagement to said first sheet and having a pattern of continuous curvilinear openings extending therethrough, said pattern of continuous curvilinear openings dividing said second sheet into a corresponding plurality of sections and being aligned with said pattern of spaced openings of said first sheet.

2. The product as recited in claim 1, wherein each section of said second sheet includes an adhesive material attached to an inward-facing surface.

3. The product as recited in claim 2, wherein said adhesive material releasably attaches each of said sections of said second sheet to said first sheet and said adhesive material remains attached to said inward-facing surface upon removal of one of said sections of said second sheet from said first sheet to enable attachment of said removed section of said second sheet to another surface.

4. The product as recited in claim 1, wherein each section of said first sheet is detachable from a remainder of said first sheet by tearing said first sheet along said one or more lines of said pattern of spaced openings.

5. The product as recited in claim 4, wherein aligned sections of said first sheet and said second sheet are removable from a remainder of said first sheet as a single unit.

6. The product as recited in claim 1, wherein each of said sections of said second sheet are detachable from a remainder of said sections of said second sheet and from said first sheet.

7. The product as recited in claim 1, wherein each of said continuous curvilinear openings extending through said second sheet is serpentine-shaped.

8. The product as recited in claim 1, wherein said continuous curvilinear openings extending through said second sheet form at least one quadrilateral.

* * * * *